US008116897B2

(12) United States Patent
Clayman

(10) Patent No.: US 8,116,897 B2
(45) Date of Patent: Feb. 14, 2012

(54) METHOD FOR MANUFACTURING MULTI-PIECE ARTICLE USING RFID TAGS

(76) Inventor: Henry Clayman, Miami, FL (US)

( * ) Notice: Subject to any disclaimer, the term of this patent is extended or adjusted under 35 U.S.C. 154(b) by 472 days.

(21) Appl. No.: 12/390,160

(22) Filed: Feb. 20, 2009

(65) Prior Publication Data
US 2010/0212565 A1 Aug. 26, 2010

(51) Int. Cl.
G06F 19/00 (2011.01)
(52) U.S. Cl. .................. 700/137; 112/470.03
(58) Field of Classification Search .......... 112/470.01–470.18, 272, 273, 112/117; 700/130–138
See application file for complete search history.

(56) References Cited

U.S. PATENT DOCUMENTS

| | | | |
|---|---|---|---|
| 4,296,700 A * | 10/1981 | Jehle et al. ............. 112/153 |
| 4,332,012 A | 5/1982 | Sekine et al. | |
| 4,611,380 A | 9/1986 | Abe et al. | |
| 4,658,741 A * | 4/1987 | Jehle et al. ............. 112/470.02 |
| 5,030,807 A | 7/1991 | Landt et al. | |
| 5,055,659 A | 10/1991 | Hendrick et al. | |
| 5,313,902 A * | 5/1994 | Shoji ............. 112/454 |
| 5,347,263 A | 9/1994 | Carroll et al. | |
| 5,355,319 A * | 10/1994 | Matsubara ............. 700/137 |
| 5,430,441 A | 7/1995 | Bickley et al. | |
| 5,446,447 A | 8/1995 | Carney et al. | |
| 5,497,140 A | 3/1996 | Tuttle | |
| 5,528,222 A | 6/1996 | Moskowitz et al. | |
| 5,566,441 A | 10/1996 | Marsh et al. | |
| 5,586,038 A | 12/1996 | Nagaoka | |
| 5,661,473 A | 8/1997 | Paschal | |
| 5,682,143 A | 10/1997 | Brady et al. | |
| 5,785,181 A * | 7/1998 | Quartararo, Jr. ............. 209/3.3 |
| 5,838,573 A * | 11/1998 | Crathern et al. ............. 700/230 |
| 5,955,951 A | 9/1999 | Wischerop et al. | |
| 6,018,299 A | 1/2000 | Eberhardt | |
| 6,107,910 A | 8/2000 | Nysen | |
| 6,121,926 A * | 9/2000 | Belcher et al. ............. 342/450 |
| 6,259,056 B1 | 7/2001 | Cowden | |
| 6,263,815 B1 * | 7/2001 | Furudate ............. 112/470.13 |
| 6,381,509 B1 | 4/2002 | Thiel et al. | |
| 6,580,358 B1 | 6/2003 | Nysen | |
| 6,629,015 B2 * | 9/2003 | Yamada ............. 700/138 |
| 6,677,917 B2 | 1/2004 | Van Heerden et al. | |
| 6,717,507 B1 | 4/2004 | Bayley et al. | |
| 6,778,847 B2 | 8/2004 | Wu et al. | |
| 6,806,808 B1 | 10/2004 | Watters et al. | |
| 6,882,897 B1 | 4/2005 | Fernandez | |
| 7,100,432 B2 | 9/2006 | Forster | |
| 7,195,165 B2 | 3/2007 | Kesler et al. | |
| 7,212,879 B2 * | 5/2007 | Hagino ............. 700/138 |
| 7,228,195 B2 * | 6/2007 | Hagino ............. 700/138 |

(Continued)

Primary Examiner — Danny Worrel
(74) Attorney, Agent, or Firm — Berenato & White, LLC

(57) ABSTRACT

A method for manufacturing a multi-piece article, such as a garment, comprises the following steps. First, at least two parts of the article are provided. Then, a radio frequency identification (RFID) tag is attached to each of the at least two parts of the article. Each of the RFID tags stores data including data identifying the part of the article associated with the RFID tag and manufacturing instructions identifying parts of the article to be connected. Next, the RFID tags including manufacturing instructions identifying matching parts of the article are scanned. Subsequently, the at least two parts of the article are connected together according to the manufacturing instructions obtained prior to the step of connecting the at least two parts so as to form at least a portion of the article.

10 Claims, 6 Drawing Sheets

U.S. PATENT DOCUMENTS

| | | |
|---|---|---|
| 7,398,133 B2 | 7/2008 | Wannier et al. |
| 7,543,744 B2 * | 6/2009 | Hart .............................. 235/385 |
| 7,762,202 B2 * | 7/2010 | Kishi et al. ................. 112/102.5 |
| 7,849,807 B2 * | 12/2010 | Suzuki et al. ............ 112/470.03 |
| 7,908,985 B2 * | 3/2011 | Okuyama .................. 112/102.5 |
| 2002/0198618 A1 | 12/2002 | Madden et al. |
| 2005/0139664 A1 | 6/2005 | Yamagiwa |
| 2007/0103304 A1 | 5/2007 | Newton et al. |
| 2008/0126424 A1 | 5/2008 | Koishi et al. |
| 2010/0212565 A1 * | 8/2010 | Clayman .................. 112/475.09 |

* cited by examiner

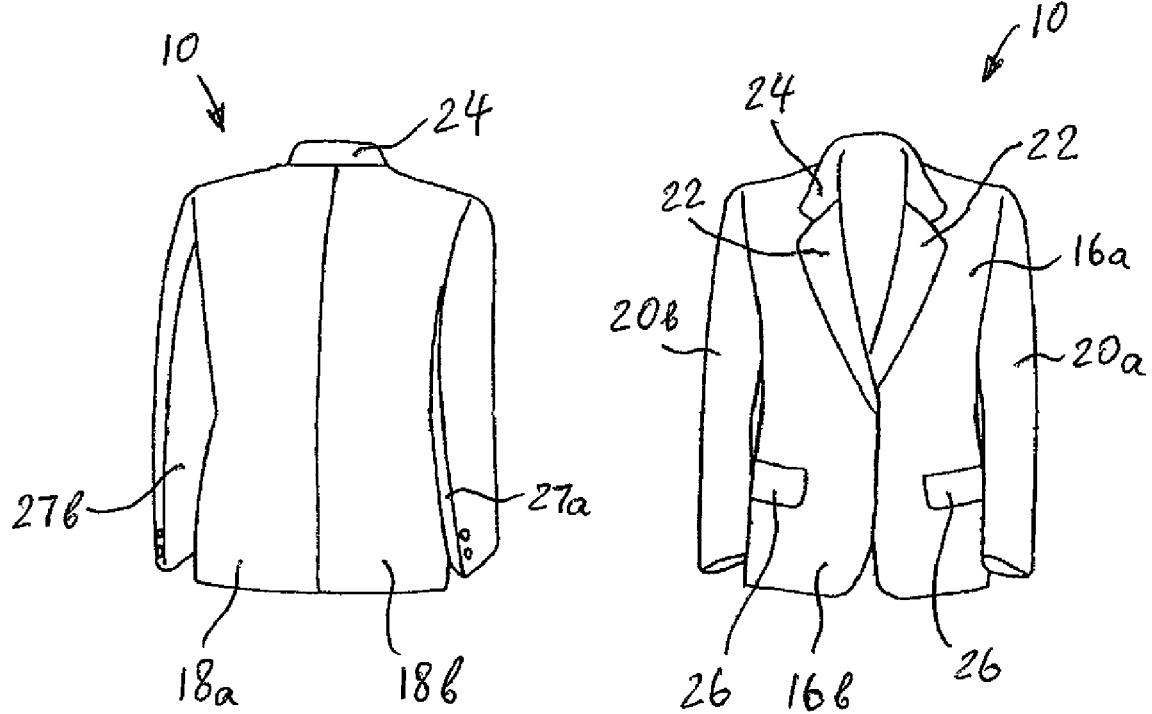

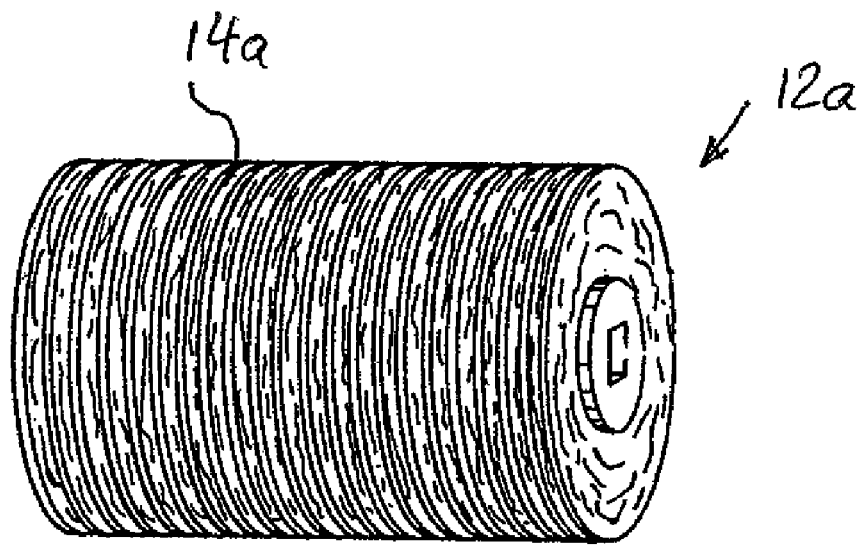
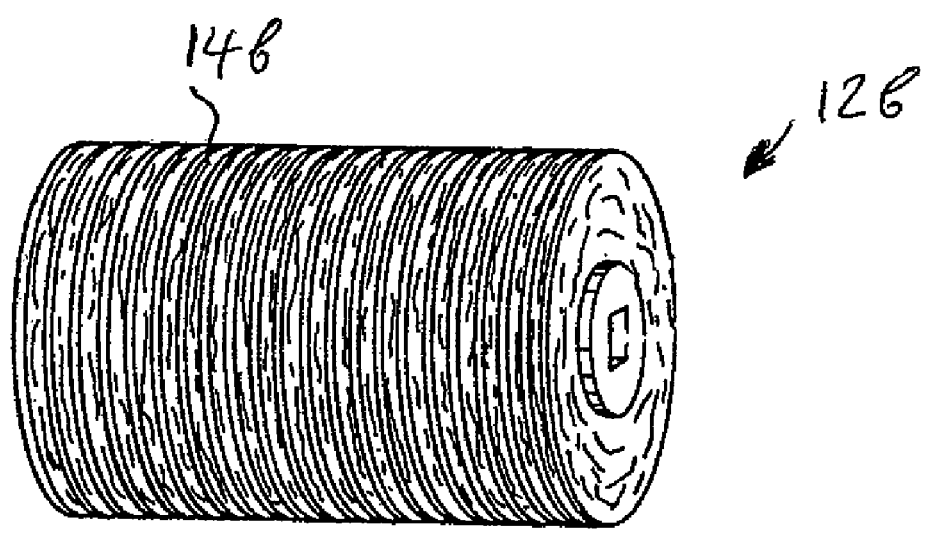
Fig. 4A

METHOD FOR MANUFACTURING MULTI-PIECE ARTICLE USING RFID TAGS

BACKGROUND OF THE INVENTION

1. Field of the Invention

The present invention relates to manufacturing methods in general, and more particularly to a method for manufacturing a multi-piece article, such as a garment, with the assistance of radio frequency identification (RFID) tags.

2. Description of the Prior Art

In a production facility manufacturing multi-part articles, such as articles of clothing (or garments), a number of components (or parts) are connected together through different manufacturing operations. A typical example of such a production facility is a ready to wear garment manufacturing factory, where various components of garments, such as men's jackets, are cut and sewn together. In such factories, a roll of wool or other fabric (cloth) suitable for the jacket is supplied in 60 yard rolls (sometimes more, sometimes less), about 60 inches wide, and the jacket would require about 2 yards of cloth, depending on factors such as size and style, e.g. single or double breasted. In ready to wear manufacturing multiple garment components are cut from the rolls of fabric at one time by means of a marker (similar to a template), on which the patterns for each size and style of the garment are traced. There could be five different sizes on the same marker which would require a 10 yard length of cloth (ply) and it is customary to stack multiple plies, the height of the stack being limited by the cutting technique (band saw, straight or circular knife cutting machine, etc.) which will cut around the individual pieces as drawn on the marker. If twenty plies were stacked to produce 100 jackets then multiple rolls of cloth would be required and these are frequently from different dye lots. Therefore cloth for a navy blazer from different dye lots may appear superficially the same but if a sleeve from dye lot A was sewn to a jacket body from dye lot B, then there may be a noticeable difference when the parts are in juxtaposition. A similar error could occur if incorrectly sized parts were sewn together, e.g. a back from a 38" chest jacket with foreparts (fronts) from a 42" chest jacket.

While known manufacturing methods for manufacturing multi-part articles, including but not limited to those discussed above, have proven to be acceptable for various applications, such manufacturing methods are nevertheless amenable to improvements.

Various technologies have been developed for identifying and tracking objects. The most common involves application of identifying bar codes to objects and optically scanning those codes to identify the objects or certain other relevant coded characteristics, e.g., size, model, price, etc. A more recent development is radio frequency identification technology, commonly known as RFID technology. RFID devices, commonly called RFID tags, are thin transponders (transceivers) that include an integrated circuit chip having RF (radio frequency) circuits, control logic and memory, plus an antenna, all mounted on a supporting substrate. RFID devices are either of the active type or passive type. The active type RFID tags include a battery for powering a transceiver. The passive type RFID tags have no battery and derive its energy from the RF signal used to interrogate it. The RFID transponder operates to receive, store and transmit object-identifying data to and from the memory within the chip. The device functions in response to coded RF signals received from a base station. Typically it reflects the incident RE carrier back to the base station, and information stored in the device is transmitted back to the interrogating base station by modulating the reflected signal according to the programmed information protocol.

Recent developments have produced thin RFID tags on flexible organic substrates, with the overall thickness of the tags being of the order of a fraction of a millimeter, typically about 1.5 mils thick. Various materials have been used as the organic substrate of commercial REID tags, including but not limited to thin flexible films of a polyester such as Mylar®™ or a polyimide such as Kapton®™. The antenna may comprise pre-formed wires that are attached to the substrate, but more commonly it is a thin film element, usually consisting of 25 to 25 micron thick copper lines formed by plating copper onto the flexible organic substrate or by etching in the case where the substrate is a copper/organic material laminate. Further information regarding the manufacture and use of RFID transponders is provided by U.S. Pat. No. 5,497,140, issued Mar. 5, 1996 to J. R. Tuttle; U.S. Pat. No. 5,528,222, issued Jun. 18, 1996 to P. A. Moskowitz et al.; U.S. Pat. No. 5,566,441, issued Oct. 22, 1996 to M. J. C. Marsh et al.; U.S. Pat. No. 5,661,473, issued Aug. 26, 1997 to J. P. Paschal; U.S. Pat. No. 5,682,143, issued Oct. 28, 1997 to M. J. Brady et al.; U.S. Pat. No. 5,955,951, issued Sep. 21, 1999, and U.S. Pat. No. 6,018,299, issued Jan. 25, 2000 to N. H. Eberhardt. The greatest disadvantage of bar codes is that they are not dynamic carriers of information, require direct or proximal line of sight contact for reading and are adversely impacted by dirt, grime and soiling. With bar codes the stored information is static. Consequently information stored in bar codes on an object cannot be updated as it travels, for example, from a shipper to a receiver. In contrast, RFID tags are programmable and offer the capability of updating recorded information at any time and in real time. The information stored in the RFID tag may be updated using a writing device to wirelessly transmit the new information to be stored. Updating information in bar code tags typically requires printing a new tag to replace the old. RFID transponders are of particular value to industries that need to quickly and accurately track and manage very large numbers of objects. The passive type of RFID tag is particularly valuable in relation to inventory management and control because it offers a long life data storage and retrieval capability, since it draws its energy and transfers information in the form of low power radio waves resulting from operation of the read/write module of a base station.

Small lightweight RFID foil tags have long been implemented in security systems in retail stores. The foil RFID tag is secured to a product and is capable of storing information regarding the product or sale status. A RFID interrogator is used to read the tag, record the sale of the item, and write to the tag to change the status to purchased, to allow the product and tag to leave the store without tripping the stores security alert system. The technology to use such RFID tags for inventory and assembly lines etc. are known in the art to facilitate reading and writing to small RFID foil tags without contact and without the need for a power supply to the tag itself Rather, the tag relies on modulated radio frequencies from the RFID reader/writer to exchange information. Various RFID systems are disclosed in U.S. Pat. Nos. 6,717,507; 6,806,808; 5,055,659; 5,030,807; 6,107,910; 6,580,358; and 6,778,847 each of which are hereby incorporated herein by reference.

RFID tags are rapidly becoming the preferred method of inventory tracking in retail and distribution applications and will likely surpass bar codes as the preferred point-of-sale checkout identifier. For example, bar codes are limited in size by resolution limitations of bar code scanners, and the amount of information that the symbols can contain is limited by the physical space constraints of the label. Therefore, some objects (products or merchandise) may be unable to accommodate bar code labels because of their size and physical configuration. In contrast, RFID tags store their information in digital memory. Thus, they can be made much smaller than bar code tags.

With this in mind, a need exists to develop a manufacturing method for manufacturing multi-part articles that advance the art, such as a method for manufacturing articles of clothing (or garments) using RFID tags.

SUMMARY OF THE INVENTION

The present invention is directed to a novel method for manufacturing a multi-piece article, such as a garment, with the assistance of radio frequency identification (RFID) tags.

The method according to the present invention comprises the following steps. First, at least two parts of the article are provided. Then, a radio frequency identification (RFID) tag is attached to each of the at least two parts of the article. Each of the RFID tags stores data including data identifying the part of the article associated with the RFID tag and manufacturing instructions identifying parts of the article to be connected. Next, the RFID tags including manufacturing instructions identifying matching parts of the article are scanned. Subsequently, the at least two parts of the article are connected together according to the manufacturing instructions obtained prior to the step of connecting the at least two parts so as to form at least a portion of the article.

Therefore, the present invention provides a novel method for manufacturing a multi-piece article using a number of RFID tagged parts to effect a more efficient and accurate manufacturing method to form a marketable product.

BRIEF DESCRIPTION OF THE DRAWINGS

Other objects and advantages of the present invention will become apparent from a study of the following specification when viewed in light of the accompanying drawings, wherein:

FIG. 1 is a front view of a jacket showing a jacket produced according to the preferred embodiment of the present invention;

FIG. 2 is a back view of a jacket showing the jacket produced according to the preferred embodiment of the present invention;

FIG. 4A is a perspective view of rolls of fabric for manufacturing the jacket produced according to the preferred embodiment of the present invention;

DETAILED DESCRIPTION OF PREFERRED EMBODIMENTS

Figure 3:
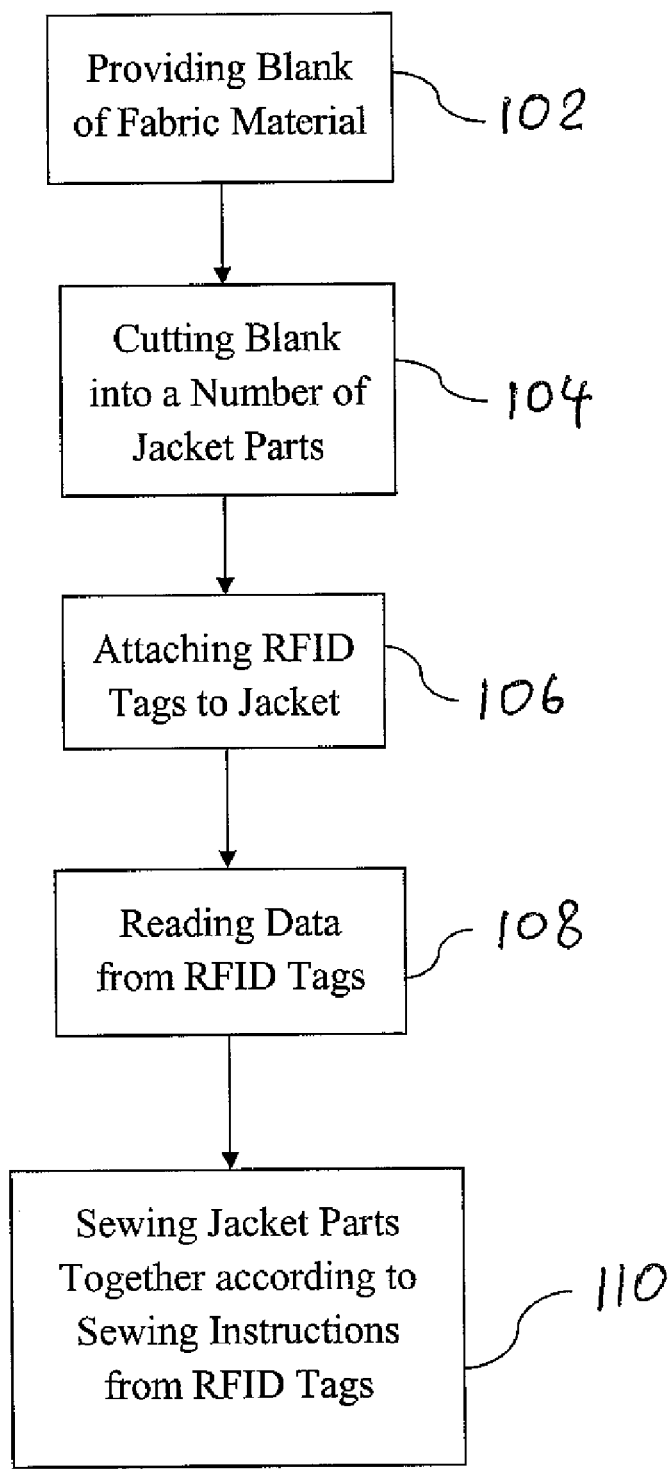
FIG. 3 is a flow chart illustrating a method for manufacturing the jacket according to the preferred embodiment of the present invention.

The preferred embodiment of the present invention will now be described with the reference to accompanying drawings.

For purposes of the following description, certain terminology is used in the following description for convenience only and is not limiting. The words "right," "left," "front", "back", "top" and "bottom" designate directions in the drawings to which reference is made. The terminology includes the words above specifically mentioned, derivatives thereof and words of similar import. Additionally, the word "a", as used in the claims, means "at least one."

FIGS. 1 and 2 of the drawings illustrate a man's jacket or blazer, generally denoted by reference numeral 10, manufactured according to the preferred embodiment of the present invention. The garment 10 is sewn together from a number of separate and mostly different parts. Although, the preferred embodiment of the present invention is described with the reference to the method for manufacturing an upper garment, specifically the man's jacket, it will be appreciated that that the present invention is equally applicable to any multi-piece garment or any other multi-piece article.

Referring now to FIG. 3, the method for manufacturing the multi-piece garment, such as the man's jacket 10, according to the preferred embodiment of the present invention comprises the following steps.

First, in the step 102, a blank (or length) of fabric material suitable for manufacturing of the jacket 10, such as wool, is provided. Conventionally, the length of fabric material is supplied in the form of one or more rolls 12 of wool fabric (cloth) 14 (two rolls of wool fabric 12a and 12b are shown in FIG. 4A) of the same color, such as a popular navy color. Typically, the rolls 12 of the wool cloth 14 suitable for the jacket 10 are supplied in 60 yard rolls (sometimes more, sometimes less) and the jacket 10 would require about 2 yards of cloth 14, depending on factors such as size and style, e.g. single or double breasted. Moreover, the rolls 12 of wool fabric 14 are frequently supplied from different dye lots. In the exemplary embodiment of the present invention and as illustrated in FIG. 4A, the roll 12a of the wool fabric 14a is supplied from the dye lot A, while the roll 12b of the wool fabric 14b is supplied from the dye lot B, although both rolls 12a and 12b are used for manufacturing the navy blazer 10.

Figure 4B:
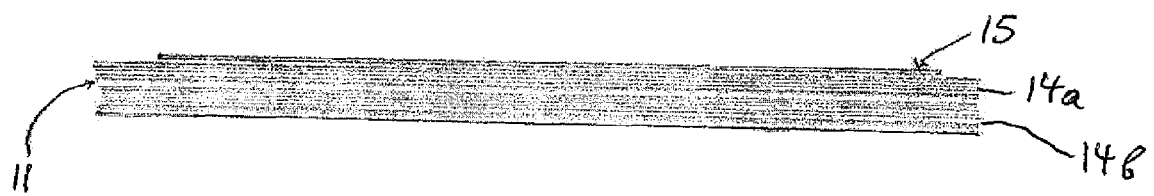
FIG. 4B is a sectional view of plies of lengths of the wool fabric material stacked horizontally for cutting.

Next, in the step 104, the length of fabric material is cut into the number of the separate parts, which, when sewn together, form the jacket 10. As is typical in a ready-to-wear manufacturing and shown in FIG. 4B, the multiple garment pieces (or parts) are cut at one time by means of a marker 15, on which patterns for each size and style are traced (not shown). Specifically, as illustrated in FIG. 4B, plies of the lengths of the wool fabric material 14a and 14b of the rolls 12a and 12b are stacked horizontally. The terms "spread" or "layed-up" are sometimes used synonymously with the term "stacked". The plies of the length of the fabric 14b of the roll 12b are stacked first, then separated the subsequent plies of the length of the fabric 14a of the roll 12a by a paper or other separation material 11. It will be appreciated that the plies of the fabric from more than two rolls could be stacked together. The marker (template) 15 is placed on top of the stack. Then, the lengths of fabric material are cut into the following separate parts shown in FIG. 5: left and right front parts 16a and 16b, respectively; left and right back parts 18a and 18b, respectively; left and right top sleeve parts 20a and 20b, respectively, and left and right under sleeve parts 27a and 27b, respectively; two facing parts 22; two collar parts 24 (outer and under collar parts); and various outer and under pocket flap parts 26 (six pieces or more). There may be more or less parts e.g. more if there is a center vent at the back or less if a one-piece back is desired. There could be five different sizes on the same marker which would require a 10 yard length of cloth (or ply) and it is customary to stack multiple plies, the height of the stack being limited by the cutting technique (such as band saw, straight or circular knife cutting machine, etc.) which will cut around the individual pieces as drawn on the marker. If twenty plies were stacked to produce 100 jackets then multiple rolls of cloth would be required and these are frequently from different dye lots, such as the dye lots A and B, as described above. Therefore, the fabric 14 for the navy blazer 10 from the different dye lots may appear superficially the same, but if a sleeve part from the wool fabric 14*a* of the roll 12*a* (dye lot A) is sewn to a jacket body part from the wool fabric 14*b* of the roll 12*b* (dye lot B), then there may be a noticeable difference when the parts are in juxtaposition.

Figure 5:
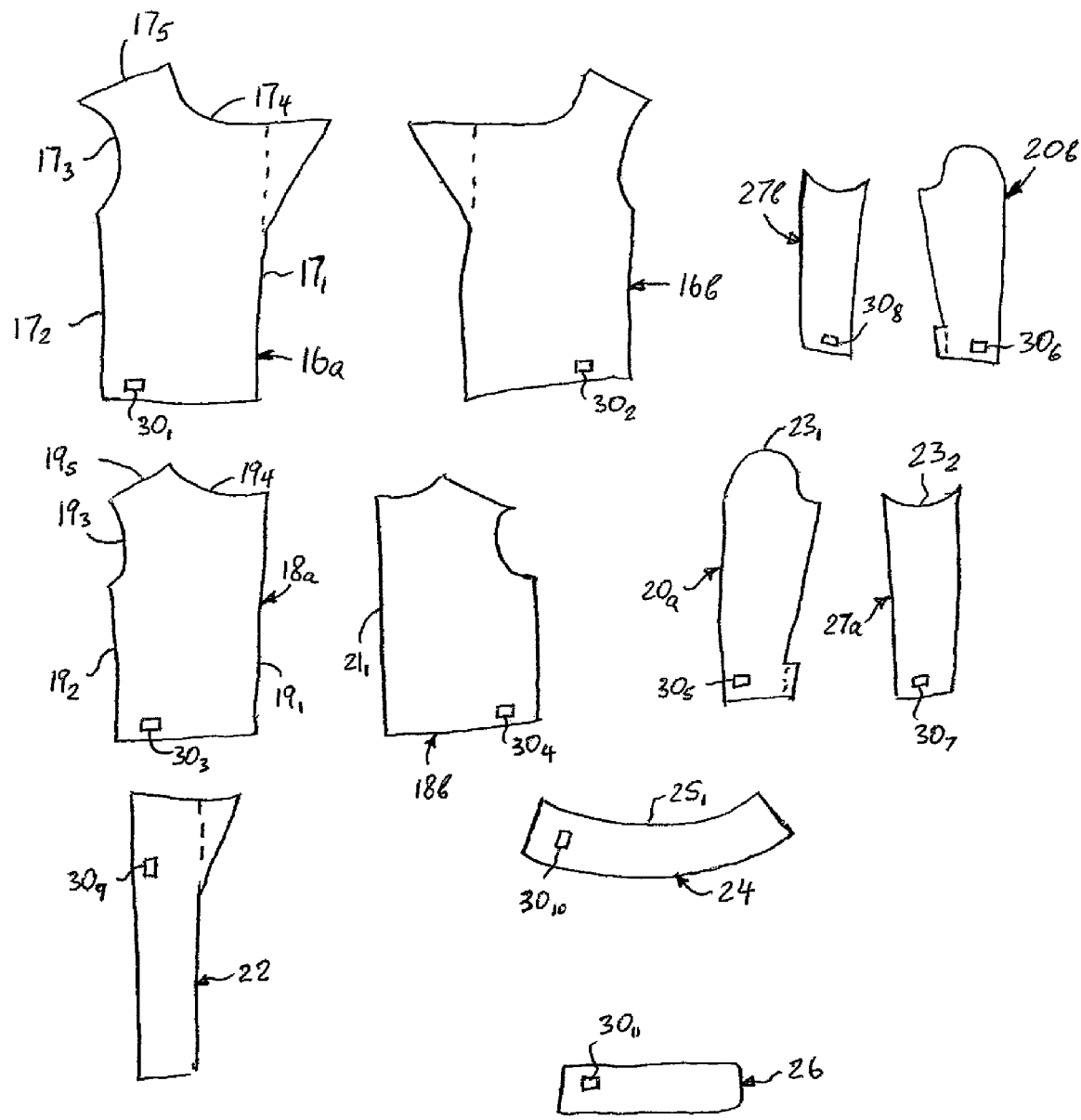
FIG. 5 is a schematic view of separate garment parts forming the jacket of the present invention.

Then, in the step 106, at least two radio frequency identification (RFID) tags are provided each associated with only one of at least two pre-cut parts, and each of the RFID tags is attached only to the associated one of the at least two juxtaposed pre-cut parts of the garment 10 for uniquely identifying each of the jacket parts associated with the particular RFID tag. Preferably, the RFID tag is attached to each of the pre-cut jacket parts 16*a*-27*b*. Specifically, as illustrated in FIG. 5, the left and right front parts 16*a* and 16*b* are provided with RFID tags $30_1$ and $30_2$, respectively; the left and right back parts 18*a* and 18*b* are provided with RFID tags $30_3$ and $30_4$, respectively; the left and right top sleeve parts 20*a* and 20*b* are provided with RFID tags $30_5$ and $30_6$, respectively; the left and right under sleeve parts 27*a* and 27*b* are provided with RFID tags $30_7$ and $30_8$, respectively; the two facing parts 22 are provided with an RFID tag $30_9$, respectively; each of the two collar parts 24 (outer and under collar parts) is provided with an RFID tag $30_{10}$; and each of the various outer and under pocket flap parts 26 is provided with an RFID tag $30_{11}$. The RFID tags $30_1$-$30_{11}$ attached to (or associated with) the different parts of the garment 10 are structurally identical in this embodiment and differ only by a content of information (data) stored in each of the RFID tags $30_1$-$30_{11}$. In view of these similarities, and in the interest of simplicity, the following discussion will sometimes use a reference numeral without a letter to designate an entire group of substantially identical structures. For example, the reference numeral 30 will be used when generically referring to each of the left and right side wall assemblies $30_1$-$30_{11}$ rather than reciting all nine reference numerals.

Figure 6:
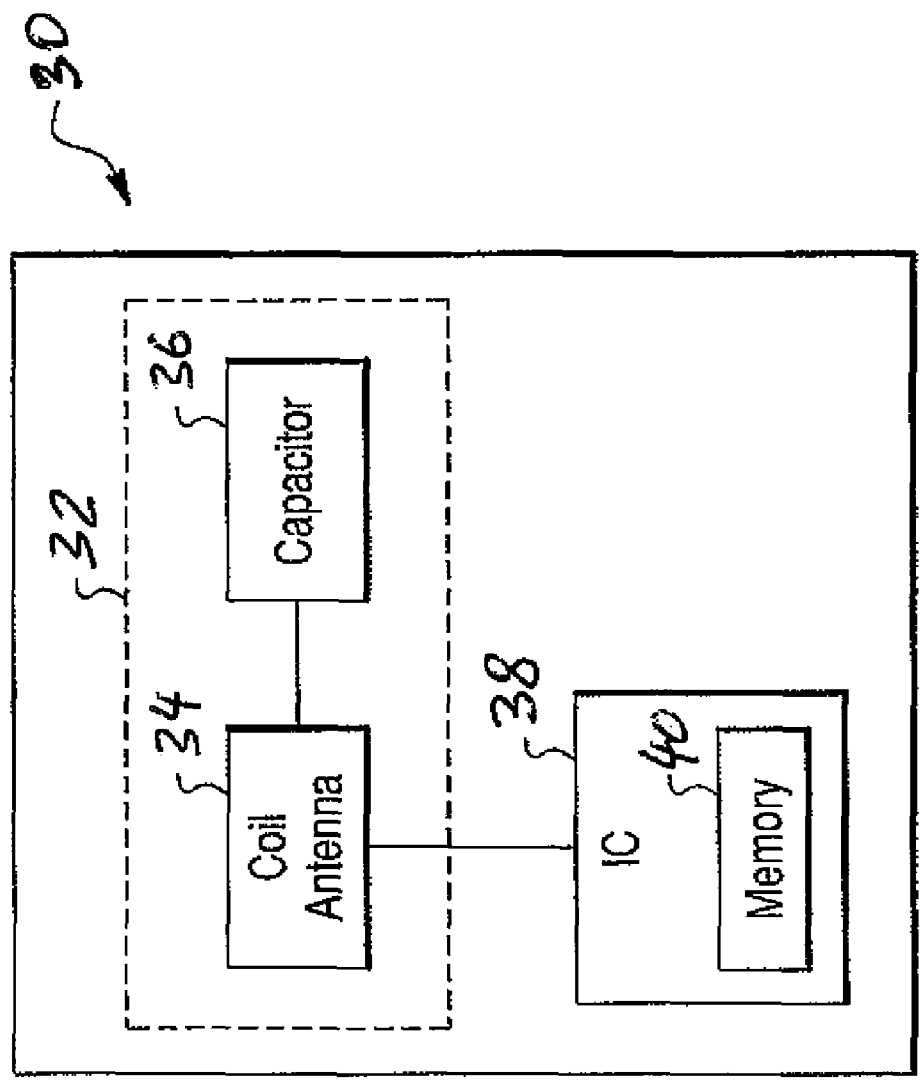
FIG. 6 is a schematic view of an RFID tag suitable for use with the present invention.

FIG. 6 schematically illustrates the exemplary embodiment of the RFID tag 30 suitable for use with the parts of the garment 10 of the present invention. The RFID tag 30 comprises a passive resonant radio frequency (RF) circuit 32 for use in detecting when the RFID tag 30 is within a zone monitored by a reader or interrogator, as is well-known in the art. One well-known type of circuit 32 has a coil antenna 34 and a capacitor 36 which together form a resonant circuit with a predetermined resonant frequency, i.e. the selected radio frequency determined by the values of the coil and the capacitor. Power for the RFID tag 30 is derived from an incident signal to the antenna 34 in a conventional manner. Furthermore, the RFID tag 30 includes an integrated circuit (IC) 38 for providing "intelligence" to the RFID tag 30. The IC 38 is electrically connected to the resonant circuit 32. The capacitor 36 may be either external to the IC 38, or the capacitor 36 may be within the IC 38, depending upon the desired implementation of the circuit 32. The IC 38 includes a programmable memory 40, such as a 30 bit memory, for storing various data related to the part of the garment 10 to which the particular RFID tag 30 is attached and to the garment 10. The IC 38 outputs a data stream comprised of the stored data (i.e. 30 bits in the present embodiment) when sufficient power from the antenna 34 is applied thereto. In one embodiment of the invention, the data stream creates a series of data pulses by switching an extra capacitor (not shown) across the coil antenna 34 for the duration of the data pulses. The addition of the extra capacitor changes the resonant frequency of the RF circuit 32, detuning it from the operational frequency. Thus, instead of the RF circuit 32 returning a simple single frequency response signal, it returns a signal containing a packet of preprogrammed information. The packet of information (data pulses) is received and processed by interrogator receiving circuitry and is decoded (if necessary) to provide information related to the part of the garment 10 associated with the RFID tag 30, i.e. the part of the garment 10 to which the particular RFID tag 30 is secured or attached. Other methods of using the data in the memory 40 to output identification data from the RFID tag 30 are within the scope of the invention. The IC 38 is preferably also a passive device and is powered in the same manner as the RF circuit 32 (i.e., by using energy received at the antenna 34 from the interrogator transmitter signal). It will be appreciated that any type of RFID tags is within the scope of the present invention. Examples of other RFID tags which are suitable for use as the RFID tag 30 of the present invention are shown in U.S. Pat. No. 5,446,447 (Carney et al.), U.S. Pat. No. 5,430,441 (Bickley et al.), and U.S. Pat. No. 5,347,263 (Carroll et al.). Typically, RFID tags are not subject to physical deactivation. In other words, no physical change or change of magnetic state occurs to the state of the coil, capacitor or any other element comprising the antenna circuit of such RFID tags. An RFID tag which may not be physically deactivated has significant advantages over physically deactivatable magnetic security tags and/or prior art physically deactivatable RF security tags which are commonly used today because such REID tags are more difficult to bypass. Preferably, the RFID tag 30 is non-physically deactivatable RFID tag. Alternatively, a physically deactivatable RFID tag may be used. Although the preferred embodiment of the RFID tag 30, illustrated in FIG. 6, includes a resonant circuit having a coil antenna and a capacitor and an IC, an RFID tag which has only a coil antenna and an IC is also within the scope of the present invention. Preferably, the RFID tag 30 is re-usable; however disposable RFID tags are also within the scope of the present invention.

Each of the RFID tags 30 provides various information (data, data pulses), stored in the programmable memory 40 thereof, related to the part of the garment 10 to which the particular RFID tag 30 is attached and to the garment 10, comprising information including part identifying data and sewing instructions. Specifically, the part identifying data includes data identifying the part of the garment 10 associated with the RFID tag 30 (i.e. the part of the garment 10 to which the particular RFID tag 30 is attached, size, type, style and color of the garment 10) and fabric material of this particular part. The part identifying data can further include date, location, operator, fabric manufacturer, garment manufacturer and customer information (such as a retail store, a private person, etc.). The sewing instructions include data identifying the one or more parts of the garment 10 that has to be juxtaposed and sewn to the part of the garment 10 associated with the particular RFID tag 30 (i.e. the parts juxtaposed for sewing operation with the part of the garment 10 associated with the particular RFID tag 30) and sewing directions (e.g. manufacturing operations to be performed, a sewing machine to be used, thread gage, needle gage, etc.). For instance, in the exemplary embodiment of FIG. 5, the part identifying data of the RFID tag $30_3$ attached to the garment part 18*a* identifies the part 18*a* as the left back part of a navy blazer of the size 38". The left back part 18*a* of the navy blazer 10 has a vertical center line $19_1$, a vertical sideline $19_2$, a margin $19_3$, and a neckline $19_4$, as illustrated in FIG. 5. The RFID tag $30_3$ further identifies the material of the left back jacket part 18*a* as a wool fabric cut from roll 12*a* of the wool fabric 14*a* supplied from dye lot A. Moreover the sewing instructions stored in the RFID tag $30_3$ attached to the jacket part $18a$ include sewing instructions, such as sewing machine to be used, thread gage, thread color, needle gage, etc., and instructions to sew the left back part $18a$ to the right back part $18b$ and to the left front part $16a$ of the garment 10 so that the vertical center line $19_1$ of the part $18a$ is juxtaposed with a vertical center line $21_1$ of the part $18b$, while the vertical side line $19_2$ is juxtaposed with a vertical sideline $17_2$ of the part $16a$. Furthermore, the sewing directions instruct to sew the left top sleeve part $20a$ to the left under sleeve $27a$. Prior to this, a shoulder seam $19_5$ of the left back jacket part $18a$ has been sewn to a shoulder seam $17_5$ of the left front part $16a$ of the garment 10, thus forming a left armhole. The part of the formed sleeve comprising $23_1$ and $23_2$ is known as a sleeve head and this is sewn into the aperture defined by the margins of $19_3$ and $17_3$ of jacket parts $18a$ and $16a$, respectively. Information on the RFID tags $30_1,30_3$, $30_5$ and $30_6$ provide instructions so that the parameters, such as size, dye lot and match (i.e. left or right), are correct. The other parts of the jacket, for example collar, facing, pocket flaps etc., are assembled with the RFID tag information using techniques well known in the garment industry. It should be understood that the RFID tag 30 may be both of the active and passive type.

The RFID tag 30 is attached or printed on front or rear face of the jacket parts $16a$-24. Specifically, an adhesive RFID tag could be applied to the inner surface of each garment part and subsequently be left in situ to be covered by the lining. Alternatively the RFID tag could be tacked to the garment part by equipment well known in the art. Another strategy would be to attach the RFID tag by adhesive or tacking to the periphery of the individual garment parts so that it would be on the edge of the seam and out of view. Moreover its position on the margins of the seam precludes needle marks from the tacking equipment or adhesive stains (on pressing) which may be visible on some fine fabrics. The RFID tag 30 can be scanned through the fabric, without requiring a line of sight for reading.

Next, according to the preferred embodiment of the method for manufacturing the multi-piece garment of the present invention, the jacket part $16a$-24 provided with the attached RFID tags 30 are transferred to a sewing station provided with any appropriate RFID reader well known in the art.

In the step 108, the data from the RFID tags 30 including the data identifying the jacket part $16a$-24 and the sewing instructions identifying matching (or juxtaposed) parts of the garment 10 and sewing directions are read (or scanned) with the RFID reader.

Subsequently, in the step 110, the juxtaposed parts of the garment 10 are sewn together according to the sewing instructions stored in the RFID tags 30 so as to form the garment 10 or at least a portion thereof (if not all of the garment parts are RFID tagged). For instance, if the RFID reader at the sewing station identifies the scanned jacket part as the left back part $18a$ of the navy blazer of the size 38" cut from the roll $12a$ of the wool fabric $14a$ supplied from the dye lot A, then the left back part $18a$ is sewn to the right back part $18b$ and to the left front part $16a$ of the blazer 10 using the instructed sewing machine, thread and needle, so that the vertical center line $19_1$ of the part $18a$ is juxtaposed with a vertical center line $21_1$ of the part $18b$, while the vertical sideline $19_2$ is juxtaposed with a vertical sideline $17_2$ of the part $16a$. The RFID tags $30_4$ and $30_1$ of the right back part $18b$ and the right front part $16b$ of the blazer 10 were also scanned by the RFID reader prior to the sewing operation to insure that they are of the same type, style, size and cut from the same wool fabric $14a$ supplied from the same dye lot A as the left back part $18a$. Similarly, the other RFID tagged jacket parts are interrogated to ensure they match the corresponding parts in type, size, style and color during the assembly of the garment. In other word, sewing together the garments parts according the sewing instructions scanned from the RFID tags 30 ensures that the necessary manufacturing operations are performed upon them to result in the desired configuration of the blazer 10.

Moreover, the method of the present invention insures that the cloth for the particular garment is sewn from the same dye lots so as to appear the same, without a noticeable color and size difference when the parts are in juxtaposition. By RFID tagging the jacket parts from each individual roll, the sewing errors can be obviated. Similarly, the method of the present invention insures that incorrectly sized parts are not sewn together, e.g. the back part from the size 38" jacket is not sewn with the front parts from a size 42" jacket. As the jacket parts are RFID interrogated prior to sewing according to the present invention, not only can the error be avoided, the errant parts could be subsequently matched to their size and color appropriate (matching) parts. Therefore, RFID interrogation of RFID tagged parts throughout the manufacturing process ensures accurate color match and sizing in addition to other parameters such as date, location, operator and customer. In the event that private labeling is requested such as a blazer with the Macy's label, then the operator can be instructed via the RFID tag(s) to sew the label in the selected garments over the desired size range. The blazer lining is not depicted on the accompanying drawing figures but may also be RFID tagged and interrogated to ensure color and size match. Also, the sewing station often cannot locate, for example, the under collar parts 24 for size 38" jackets because they are concealed under a pile of larger parts. RFID interrogation will locate them because the line of sight readings are not required with this technique.

It will be appreciated that the part identifying data of one or more RFID tags 30 comprises data identifying the garment as a retail product and usually includes a product name, a brand name (manufacturer ID), and a product identification number. Preferably, the data identifying the garment 10 as the retail product is a common Electronic Product Code (EPC). The EPC is known in the art as a family of coding schemes created as an eventual successor to the bar code. The EPC was created as a low-cost method of tracking goods using RFID technology. It is designed to meet the needs of various industries, while guaranteeing uniqueness for all EPC-compliant tags. EPC tags were designed to identify each item manufactured, as opposed to just the manufacturer and class of products, as bar codes do today. The EPC accommodates existing coding schemes and defines new schemes where necessary. All EPC numbers contain a header identifying the encoding scheme that has been used. This in turn dictates the length, type and structure of the EPC. EPC encoding schemes frequently contain a serial number which can be used to uniquely identify one object. EPC Version 1.3 supports the following coding schemes:

General Identifier (GID);
a serialized version of the GS1 Global Trade Item Number (GTIN);
GS1 Serial Shipping Container Code (SSCC);
GS1 Global Location Number (GLN);
GS1 Global Returnable Asset Identifier (GRAI);
GS1 Global Individual Asset Identifier (GIAI); and
DOD Construct.

Although there is cost involved in manufacturing a garment according to the present invention, a garment manufacturer has a marketing advantage by offering a pre-tagged product incorporating the electronic product code (EPC) which is read at a point of sale (cashier's station). The garment manufacturer utilizing the method of the present invention can offer its customers the opportunity to detail the tags with special instructions such as drop shipping, e.g. six dozen blazers across a size range to Macy's, New York City and five dozen to Macy's, Miami, etc. As another example, the customer can put on the RFID tag instructions for an automatic mark-down at the RFID cashier's station if the garment is not sold in two weeks.

Therefore, the present invention provides a method for manufacturing a multi-piece article using a number of RFID tagged parts to effect a more efficient and accurate manufacturing method to form a marketable product.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for manufacturing a garment sewn from a number of pre-cut parts forming said garment when sewn together, said method comprising the steps of:
   a) providing at least two pre-cut parts of said number of said pre-cut parts of said garment;
   b) providing at least two radio frequency identification (RFID) tags each associated with only one of said at least two pre-cut parts,
   c) attaching each of said RFID tags only to associated one of said at least two pre-cut parts of said garment, each of said RFID tags storing data including data identifying said pre-cut part associated with said RFID tag and sewing instructions identifying matching pre-cut parts of said garment to be juxtaposed and sewn together;
   d) reading said data from each of said at least two RFID tags including sewing instructions identifying said matching pre-cut parts of said garment; and
   e) sewing said at least two pre-cut parts of said garment together according to said sewing instructions so as to form at least a portion of said garment if said at least two pre-cut parts being identified as said matching pre-cut parts, said sewing instructions being obtained prior to the step of sewing said at least two pre-cut parts.

2. The method for manufacturing as defined in claim 1, wherein the step of providing at least two parts of said garment includes the steps of providing a blank of fabric material and cutting said blank of fabric material into said number of said pre-cut parts of said garment such that said pre-cut parts form said garment when sewn together.

3. The method for manufacturing as defined in claim 1, wherein the step of attaching said RFID tag includes the step of attaching said RFID tag to each of said parts of said garment; and wherein said step of sewing said matching parts includes the step of sewing said matching parts of said garment together according to said sewing instructions so as to form said garment.

4. The method for manufacturing as defined in claim 1, wherein said data identifying said part of said garment associated with said RFID tag further includes a size, type, style, and color of said garment and a fabric material of said part of said garment.

5. The method for manufacturing as defined in claim 4, wherein said data identifying said part of said garment associated with said RFID tag further includes date, location, fabric manufacturer, garment manufacturer and customer information.

6. The method for manufacturing as defined in claim 2, wherein said data identifying said part of said garment associated with said RFID tag further includes information regarding a dye lot from which said blank of said fabric material is supplied.

7. The method for manufacturing as defined in claim 1, wherein said sewing instructions include data identifying the other part of said at least two parts of said garment that has to be sewn to said part of said garment associated with said RFID tag and juxtaposed therewith for sewing operation and sewing directions.

8. The method for manufacturing as defined in claim 7, wherein said sewing instructions further include the information regarding manufacturing operations to be performed, a sewing machine to be used, a thread gage, thread color and a needle gage.

9. The method for manufacturing as defined in claim 7, wherein said sewing instructions further include instruction to use said parts made of a fabric material supplied from a particular dye lot.

10. A method for manufacturing an article including a number of parts forming said article when connected together, said method comprising the steps of:
   a) providing at least two parts of said number of said parts of said article;
   b) providing at least two radio frequency identification (RFID) tags each associated with only one of said at least two parts;
   c) attaching each of said RFID tags only to associated one of said at least two parts of said article, each of said RFID tags storing data including data identifying said part of said article associated with said RFID tag and manufacturing instructions identifying matching parts of said article to be connected;
   d) reading said data from each of said at least two RFID tags including manufacturing instructions identifying said matching parts of said article; and
   e) connecting said at least two parts of said article together according to said manufacturing instructions so as to form at least a portion of said article if said at least two parts being identified as said matching parts, said manufacturing instructions being obtained prior to the step of connecting said at least two parts.

* * * * *